Figure 1:
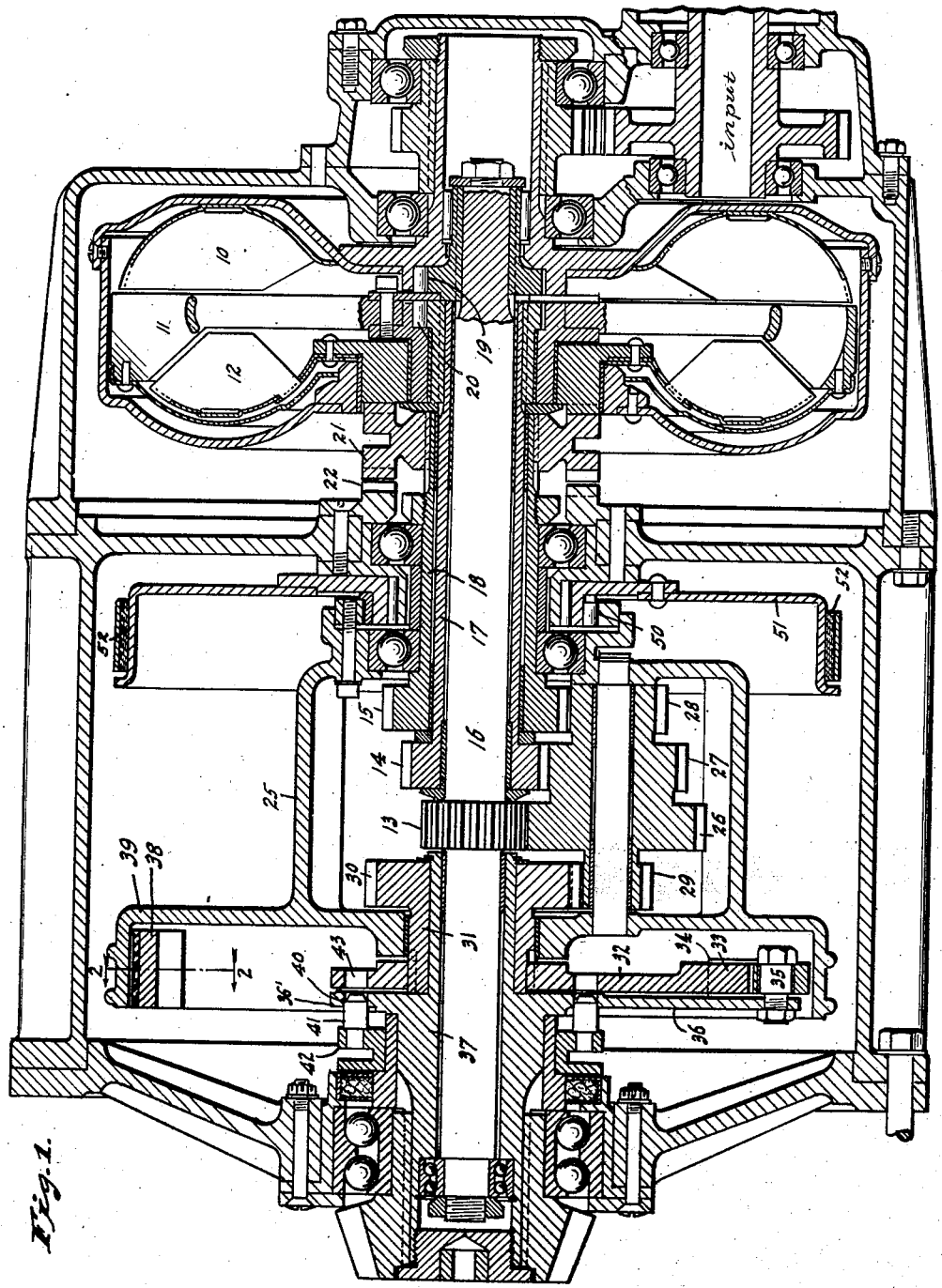

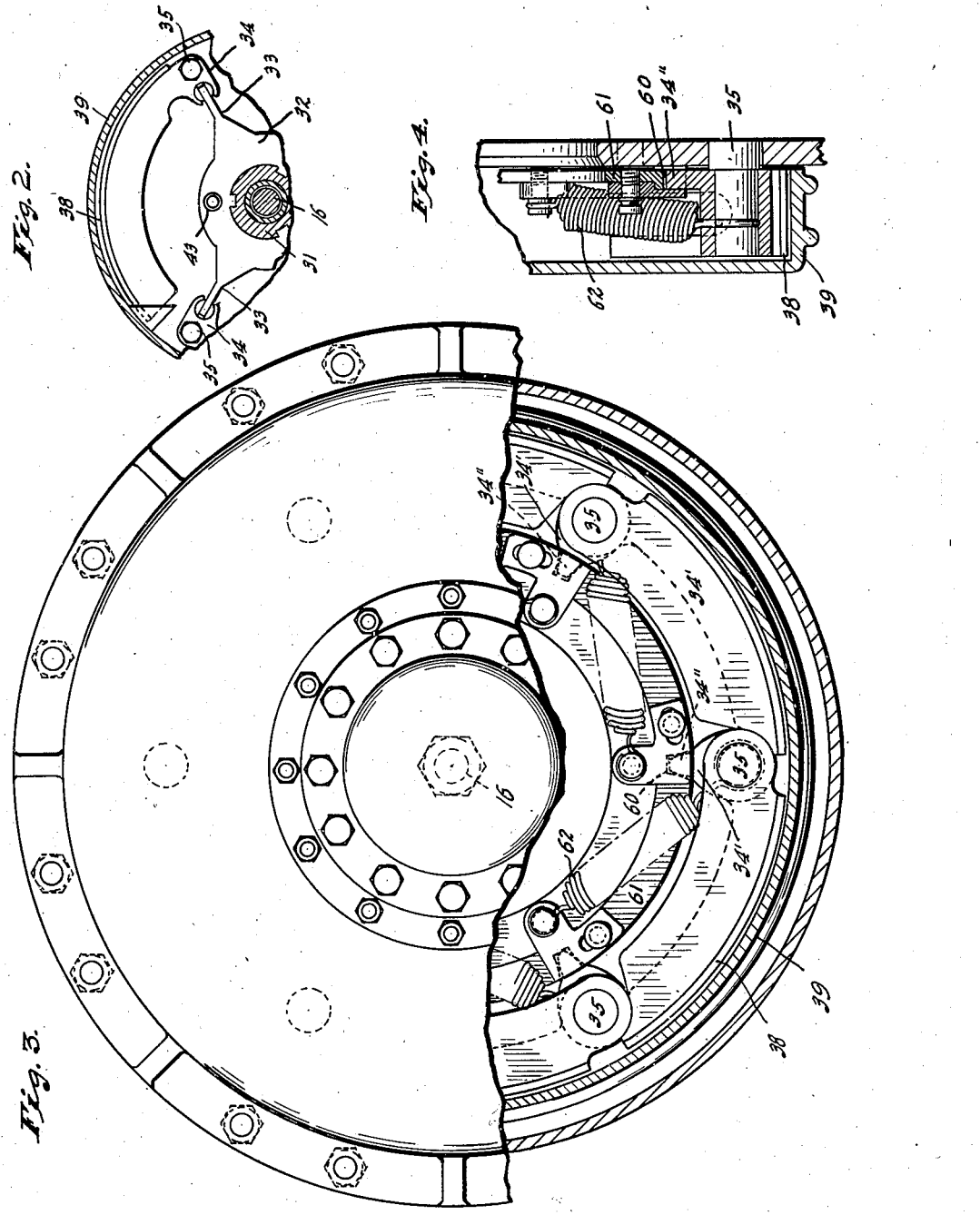

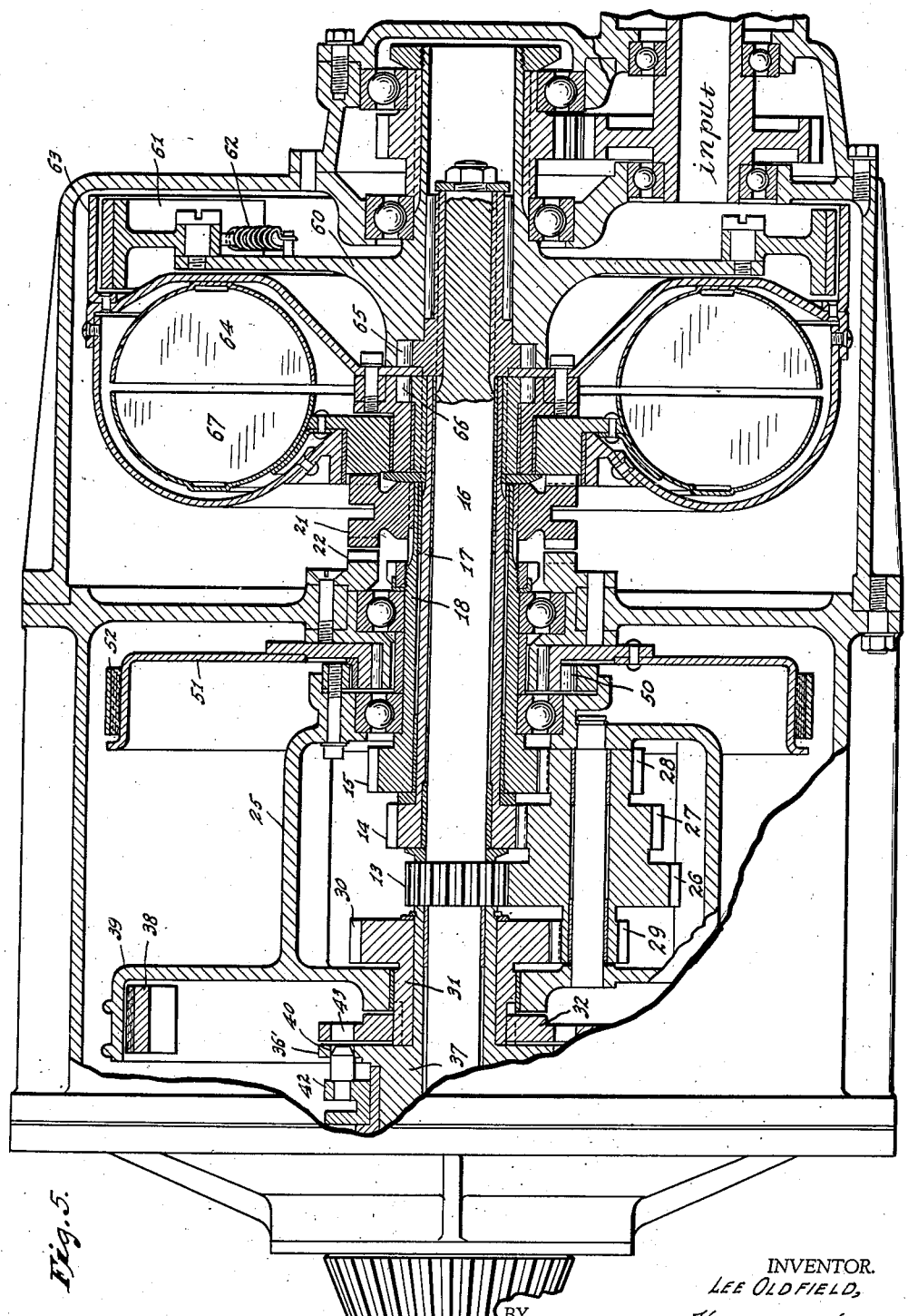

Patented June 19, 1945

2,378,577

UNITED STATES PATENT OFFICE 2,378,577

SPEED-VARYING GEARING

Lee Oldfield, Indianapolis, Ind., assignor to Marmon-Herrington Company, Inc., Indianapolis, Ind., a corporation of Indiana Application July 12, 1943, Serial No. 494,299

2 Claims. (Cl. 74—189.5)

The object of my invention is to provide a speed change gearing of the epicyclic type having the capacity of four forward and one reverse speeds.

The accompanying drawings illustrate embodiments of my invention:

Fig. 1 is an axial section of an embodiment of my invention wherein driving torque is selectively applied to the sun gears through the medium of a fluid coupling comprising two runners in series with the impeller;

Fig. 2 a section, on a reduced scale, on line 2—2 of Fig. 1;

Fig. 3 a section of a modified form of speed-torque sensitive connection between the output shaft and the carrier of the planet gear;

Fig. 4 a fragmentary axial section of the construction shown in Fig. 3; and

Fig. 5 an axial section of another embodiment of my invention.

Referring first to Figs. 1 and 2, 10 indicates the impeller element of a fluid coupling receiving power from a suitable source. Associated in series with impeller 10, in a well-known manner to form a fluid coupling, are two runners which, for convenience, will be designated first runner 11 and second runner 12.

The epicyclic gearing comprises three coaxial sun gears 13, 14, 15, carried respectively by a shaft 16, sleeve shaft 17, and sleeve shaft 18. Interposed between shaft 16 and impeller 10 is a one-way clutch 19 permitting the impeller to act only forwardly on shaft 16 and sun gear 13. Interposed between sleeve shaft 17 and the first runner 11 is a one-way clutch 20 permitting said runner to act only forwardly on shaft 18 and sun gear 14. The second runner 12 is connected to sleeve shaft 18 so as to drive said sun gear forwardly by the clutch 21 splined on sleeve shaft 18 and axially shiftable into engagement with runner 12 or into engagement with the stationary teeth 22 so as to hold shaft 18 and gear 15 stationary.

Coaxial with the sun gears is a gear carrier 25 carrying a planetary gear unit comprising gears 26, 27, 28 meshing respectively with the sun gears 13, 14, 15 and also including a planetary gear 29 rotating and revolving with gears 26, 27, 28. Gear 29 meshes with a gear 30 coaxial with the sun gears and carried by sleeve shaft 31 which also carries spider 32 having radially projecting fingers 33 engaging the short arms of weighted speed-sensitive levers 34 in opposition to centrifugal forces acting on said levers. Levers 34 are pivoted on studs 35 which are parallel with the axis of the sun gears and are carried by arms 36 projecting from flange 36' carried by the output shaft 37.

The long weighted arms of levers 34 carry friction shoes 38 adapted to engage drum 39 which is part of casing 25.

Flange 36' is provided with perforations 40 into and through which pins 41 carried by shift collar 42 may be projected into perforations 43 in spider 32 when arms 34 are in their inner, no-speed, position.

Reverse movement of carrier 25 may be prevented by one-way clutch 50 interposed between the carrier and drum 51 which may be held against rotation by manually controlled brake 52.

Operation is as follows:

It will be readily understood that the means by which power is applied to impeller 10, whether by direct connection to a prime mover, or through a driving train including a manually controlled clutch, an automatic speed-sensitive clutch, or a fluid coupling, etc., is immaterial, so far as the operation and control of my present apparatus is concerned.

*First speed forward.*—Drum 51 is held against rotation by brake 52, pins 41 are withdrawn from perforations 43, and clutch 21 is in engagement with runner 12 to connect runner 12 with sleeve 18 and gear 15. Well known connected levers for simultaneously properly controlling brake 52, clutch 21, and collar 42 would be immediately apparent to any one skilled in this art.

Upon rotation of impeller 10, shaft 16 is engaged by one-way clutch 19 to rotate sun gear 13 and the flow of power is thence through gears 26, 29, 30, sleeve 31, spider 32, levers 34, pins 35, arms 36, flange 36', to the output shaft 37, carrier 25 being held against reverse rotation, by one-way clutch 50. Impeller 10 being in forward rotation, moves runners 11 and 12 forwardly, runner 11 faster than runner 12, and sleeve 18 underruns runner 11 by reason of one-way clutch 20.

Under these conditions the reverse action of spider 32 on levers 34 prevents them from responding to low-speed centrifugal forces imposed on them so that the clutch between carrier 25 and the output shaft remains inactive.

*Second speed forward.*—As the differential between input and output torques decreases by attainment of increased speed of the load on the output shaft, or by increased speed of impeller 10, runner 11 catches up with sleeve 17, whereupon the flow of power is from runner 11 through clutch 20, sleeve 17, gears 14, 27, 29, and thence to the tail shaft as described above, and the transmission is operating in second speed.

*Third speed forward.*—Upon further decrease of the differential between input and load torques, or increased speed of impeller 10, runner 12 begins to exert a driving force on gear 15 and the flow of power is through gears 28, 29, 30 and thence to the output shaft as described above, and the device is operating in third speed.

*Fourth speed—direct drive.*—Upon further decrease of the differential between input and load torques, levers 34 respond to the centrifugal forces imposed on them and the shoes 38 are activated to couple carrier 25 with the output shaft, the epicyclic gear acting as a unit to directly couple the input and output shafts.

It should be noted, however, that the input forces continue to be imposed on the several gears of the unit through the impeller and runner elements of the fluid coupling so that, upon sufficient increase of the differential between input and load torques, the apparatus will automatically function successfully in third, second, or first speed in accordance with variations in that differential.

When a speed-sensitive clutch or fluid coupling is incorporated in the driving train for impeller 10, the motor cannot be stalled by any imposed load, but the motor cannot be rotated by forward movement of the vehicle. Where a manually controlled clutch is incorporated in the driving train for impeller 10, the above conditions are reversed.

*For reverse drive.*—Drum 51 is released and clutch 21 is shifted into engagement with teeth 22 to hold gear 15 against rotation, and pins 41 are projected into perforations 43 to prevent shoes 38 from being thrown into engagement with drum 29 because of the reverse rotation of spider 32. The flow of power is thence through 10, 19, 16, 13, 26, 28 rolling reversely on stationary gear 15, causing carrier 25 to rotate reversely thereby causing gear 29 to rotate gear 30 and the output shaft reversely. Gear 29 rotates forwardly about its own axis but also revolves reversely about the axis of the casing 25 and, as gear 29 is smaller than gear 28 and gear 30 larger than gear 15, the resultant is a low-speed reverse rotation of gear 30 and a corresponding reverse rotation of the output shaft.

Referring now to Figs. 3 and 4. The short arm of each lever 34' (34 of Fig. 1) is provided with a tooth 34'' which engages in a notch 60 in an equalizer ring 61 acted on by a series of springs 62, anchored on pins 35 to normally retract shoes 38 from drum 39. Ring 61 takes the place of spider 32 of the construction shown in Fig. 1 and is keyed to gear 30. This construction insures uniformity and initial bias of the arms 34 toward their inner positions.

It is not essential, when locking sleeve shaft 17 against rotation, as by shifting 21 into engagement with 22, to release runner 12 because reverse rotation of the output shaft may be attained even though runner 12 be held against rotation. However, if runner 12 is held against rotation it might operate as a drag on runner 11 and impeller 10 tending to decrease the attainable reverse speed of the output shaft.

The construction shown in Fig. 5, differs from that shown in Fig. 1 only in the means provided for applying torque to the several sun gears.

In this construction, power is delivered to element 60 which carries a plurality of speed-sensitive shoes 61 each biased against centrifugal response by a spring 62 and arranged, when sufficiently displaced by centrifugal action due to speed of element 60, to engage and rotate drum 63 carried by impeller 64 of a fluid coupling. Interposed between element 60 and shaft 16 is one-way clutch 65 by which shaft 16 may be rotated forwardly, and interposed between impeller 64 and sleeve shaft 17 is a one-way clutch 66 by which shaft 17 may be rotated forwardly.

The runner 67 of the fluid coupling, associated with impeller 64 may be locked to sleeve shaft 18 by clutch 21 as in the other construction.

I claim as my invention:

1. The combination with an epicyclic speed-change gearing comprising, as coaxial elements, a first sun gear, a second sun gear, a third sun gear, an output gear, a planetary-gear carrier, said several gears increased in size in the order named, and an output shaft, a planetary-gear unit having relatively fixed gear elements meshing respectively with said coaxial gears, controllable means for preventing reverse rotation of the planetary-gear carrier, and a speed-sensitive clutch between the output gear and output shaft, of input means comprising a primary input element, a one-way clutch interposed between said primary input element and the first sun gear, a secondary input element driving power from the primary input element, a one-way clutch interposed between the secondary input element and the second sun gear, a tertiary input element driving power from the secondary input element, and controllable means for blocking rotation of the third sun gear, the secondary and tertiary input elements being so associated as to be relatively rotatable at all times.

2. The combination with an epicyclic speed-change gearing comprising, as coaxial elements, a first sun gear, a second sun gear, a third sun gear, an output gear, a planetary-gear carrier, and an output shaft, a planetary-gear unit having relatively fixed gear elements meshing respectively with said coaxial gears, controllable means for preventing reverse rotation of the planetary-gear carrier, and a speed-sensitive clutch between the output gear and output shaft, of input means comprising a primary input element, a one-way clutch interposed between said primary input element and the first sun gear, a secondary input element deriving power from the primary input element, a one-way clutch interposed between the secondary input element and the second sun gear, a tertiary input element deriving power from the secondary input element, and controllable means for blocking rotation of the third sun gear, the secondary and tertiary input elements being so associated as to be relatively rotatable at all times.

LEE OLDFIELD.

CERTIFICATE OF CORRECTION.

Patent No. 2,378,577. June 19, 1945.

LEE OLDFIELD.

It is hereby certified that error appears in the printed specification of the above numbered patent requiring correction as follows: Page 2, second column, lines 36 and 40, claim 1, for "driving" read --deriving--; and that the said Letters Patent should be read with this correction therein that the same may conform to the record of the case in the Patent Office.

Signed and sealed this 25th day of September, A. D. 1945.

Leslie Frazer (Seal)                  First Assistant Commissioner of Patents.